US006270106B1

(12) United States Patent
Maki et al.

(10) Patent No.: US 6,270,106 B1
(45) Date of Patent: Aug. 7, 2001

(54) ALL TERRAIN VEHICLE WITH FULL PLATFORM STYLE FOOTREST AND FOOT SHIFTED MANUAL TRANSMISSION

(75) Inventors: Richard R. Maki; Alan S. Olson, both of Roseau; Mihai Rasidescu, Warroad; Timothy S. Wysocki, Roseau, all of MN (US)

(73) Assignee: Polaris Industries, Inc., Minneapolis, MN (US)

( * ) Notice: Subject to any disclaimer, the term of this patent is extended or adjusted under 35 U.S.C. 154(b) by 0 days.

(21) Appl. No.: 09/128,573

(22) Filed: Aug. 4, 1998

(51) Int. Cl.$^7$ .................................................. B62H 1/00
(52) U.S. Cl. .................... 280/291; 280/824; 280/762; 280/163; 280/169; 280/748; 180/21
(58) Field of Search .......................... 280/291, 288.4, 280/762, 163, 169, 748

(56) References Cited

U.S. PATENT DOCUMENTS

| D. 389,440 | 1/1998 | Walters et al. ................. D12/120 |
| 4,304,315 | 12/1981 | Hirakawa et al. ................ 180/89.1 |
| 4,372,416 | 2/1983 | Igarashi ......................... 180/215 |
| 4,451,057 | 5/1984 | Lawson .......................... 280/291 |
| 4,458,910 | * 7/1984 | Stillwagon ...................... 280/291 |
| 4,620,575 | 11/1986 | Cuba et al. ..................... 180/307 |
| 4,650,029 | 3/1987 | Foote et al. ..................... 180/248 |
| 4,664,208 | 5/1987 | Horiuchi et al. ................. 180/23 |
| 4,728,121 | 3/1988 | Graves ........................... 280/748 |
| 4,768,799 | * 9/1988 | Millican ......................... 280/291 |
| 4,852,900 | 8/1989 | Nahachewski .................... 280/291 |
| 5,062,675 | 11/1991 | Rhoden et al. ................... 296/1.1 |
| 5,107,952 | 4/1992 | Matsubayashi et al. ............ 180/349 |
| 5,152,382 | 10/1992 | Hoch et al. ..................... 192/4 R |
| 5,661,999 | * 9/1997 | Carone .......................... 280/291 |
| 5,695,023 | 12/1997 | Knurr et al. .................... 180/336 |
| 5,779,254 | * 7/1998 | James et al. .................... 280/291 |
| 5,893,424 | * 4/1999 | Hisada . |
| 6,113,112 | * 9/2000 | Mizuta ........................... 280/291 X |
| 6,116,630 | * 9/2000 | Thomas ........................... 280/291 |

FOREIGN PATENT DOCUMENTS

| 0293283 | * 12/1990 | (JP) ............................. 280/291 |
| 404278889 | * 10/1992 | (JP) ............................. 280/291 |

* cited by examiner

Primary Examiner—Lanna Mai
Assistant Examiner—David E. Herron, II
(74) Attorney, Agent, or Firm—Fredrikson & Byron, P.A.

(57) ABSTRACT

An all terrain vehicle with a foot-shifted manual transmission and a full platform-style footrest. The all terrain vehicle has a chassis carrying a straddle-type seat which is sufficiently narrow to be straddled by a rider. A laterally extending footrest is provided on each side of the chassis. The manual transmission includes a foot-operable shift lever located on one side of the chassis adjacent the footrest for shifting the transmission among a plurality of forward gears. The footrest is generally rectangular, having generally horizontal heel and toe portions, and the shift lever is positioned at approximately the same height as the heel portion. The toe portion is positioned lower than the heel portion, permitting a rider to depress the shift lever to a position lower than the heel portion of the footrest to downshift the transmission, and permitting the rider to insert his toe in between the toe portion of the footrest and the shifting lever to move the lever upwards to upshift the transmission. The platform is configured and arranged so as to prevent a toe of a rider's shoe from extending therethrough, however, thus providing full protection of the foot from below. The footrest includes a cleat formed integrally with the platform, the cleat having an upper surface positioned higher than the heel portion of the footrest. The cleat defines the forward edge of the heel portion and the rearward edge of the toe portion of the footrest, provides good foot heel location on the footrest and provides an edge about which the rider's foot may pivot during shifting.

18 Claims, 5 Drawing Sheets

ALL TERRAIN VEHICLE WITH FULL PLATFORM STYLE FOOTREST AND FOOT SHIFTED MANUAL TRANSMISSION

TECHNICAL FIELD

The invention relates to all terrain vehicles ("ATV's"), and, in particular, to ATV's having full platform style footrest protection for the feet of a driver while accommodating a conventional single lever foot shifted manual transmission.

BACKGROUND OF THE INVENTION

All terrain vehicles ("ATV's") have become very popular for both recreational and utility purposes. ATV's are off-road vehicles characterized by having four wheels (two front and two rear) with low pressure tires, handlebars connected to the front wheels for steering, a straddle-type seat designed for a single rider, laterally extending footrests on opposite sides of the vehicle, and an engine and transmission located generally beneath the straddle-type seat and substantially between the footrests. Typically ATV's are not wider than about 50 inches—most commonly about 44–48 inches in overall width. The transmission typically is connected by a suitable drive train to the rear wheels. In many applications, it is desirable to have all four wheels driven by the engine. Four wheel drive ATV's typically have one drive train connecting the transmission to the rear wheels and a separate drive train connecting the transmission to the front wheels.

Two types of transmissions systems have been employed on ATV's: manual transmissions and continuously variable transmissions (CVT's). Most ATV manufacturers have historically used manual transmissions. The manually shifted transmission receives rotational power from the engine and, through gear reduction, provides that power to the drive wheels. Manual transmissions typically employ a conventional shifting clutch which can be activated by a handlebar-mounted hand operated lever or can be semi-automatically actuated by the shifting mechanism. The shift mechanisms of such manual transmissions typically employ a foot-operable shift lever located at a convenient position—usually on the left side of the vehicle a few inches in front of a laterally extending foot peg on which the rider rests the foot used to operate the lever.

A number of years ago the assignee of the present invention introduced the use of continuously variable transmissions (CVT's) on ATV's. CVT's typically employ a pair of split sheave clutches around which an endless belt is disposed. One of the clutches is connected to the output shaft of the engine, and the other clutch is connected to the input shaft of a gearbox. The CVT provides automatic and infinitely variable gear reduction from the output shaft of the engine to the input shaft of the gearbox, thus eliminating the need to shift the vehicle from one forward gear to the next as the vehicle accelerates. The gearbox is employed simply to shift from forward to neutral and reverse, as the CVT eliminates any need to shift among various forward gears. If desired, the gearbox may provide some additional gear reduction, and may include, e.g., an extra low forward gear for heavy pulling conditions. The gearbox is shifted by a hand operated lever when the vehicle is not moving.

Since the CVT eliminated the need for a foot-operated shift lever, it was possible for the assignee of the present invention to replace the foot pegs with full platform-style foot rests. Such footrests are shown, e.g., in U.S. Pat. No. D389,440. Each footrest provides a generally rectangular platform which is both longer and wider than the rider's foot. Each footrest also includes front and rear walls extending upwardly from the ends of the platform. Since each footrest is disposed between one of the front wheels and one of the rear wheels, the front wall of the footrest forms a part of the front fender, and the rear wall of the footrest forms a part of the rear fender.

Manufacturers of ATV's utilizing manual transmissions shifted by a foot-operated shift lever have occasionally attempted to increase the protection for a rider's foot by providing a footrest larger than the traditional foot peg. For example, U.S. Pat. No. 4,768,799 shows a footguard which can be retrofitted onto an ATV with a conventional foot peg/shift lever system. The footguard includes a generally rectangular metal frame extending around the area of the foot peg and shift lever, and includes a plate on which the rider may rest his heel. To permit the required up and down movement of the shift lever, however, the pad of the shift lever (i.e., the portion of the shift lever engaged by the rider's foot) is generally centered in a large opening in the footguard—the opening being sufficiently large for the rider to insert his foot through the opening (this being necessary to permit the operator to push the lever upward to upshift the manual transmission).

SUMMARY OF THE INVENTION

The invention provides an all terrain vehicle with a conventional single lever foot-shifted manual transmission and a full platform-style footrest. The all terrain vehicle has a chassis carrying a straddle-type seat which is sufficiently narrow to be straddled by a rider. A pair of front wheels are mounted to the chassis and steered by handlebars connected to a suitable steering linkage. A pair of rear wheels are also mounted to the chassis. A laterally extending footrest is provided on each side of the chassis. The ATV's engine, carried by the chassis generally beneath the straddle-type seat and between the footrests, is connected to a manual transmission which in turn is connected to a drive train supplying motive power to at least the rear wheels.

The transmission includes a foot-operable shift lever located on one side (typically the left side) of the chassis adjacent the footrest for shifting the transmission among a plurality of forward gears. The footrest is generally rectangular, having generally horizontal heel and toe portions, and the shift lever is positioned at generally the same height as the heel portion. The toe portion is positioned lower than the heel portion, permitting a rider to depress the shift lever to a position lower than the heel portion of the footrest to downshift the transmission, and permitting the rider to insert his foot in between the toe portion and the shift lever to move the shift lever upward to upshift the transmission. The platform is configured and arranged so as to prevent a toe of a rider's shoe from extending therethrough, however, thus providing full protection of the foot from below.

Preferably the heel and toe portions of the footrest are defined by a continuous platform, and include a cleat formed integrally with the platform, the cleat having an upper surface positioned higher than the heel portion of the footrest. The cleat defines the forward edge of the heel portion and the rearward edge of the toe portion of the footrest. The rider can engage his heel against the cleat to properly locate his foot, and the cleat also provides an edge around which the rider may pivot his foot during upward and downward shifting movement.

DETAILED DESCRIPTION OF THE INVENTION

Figure 1:
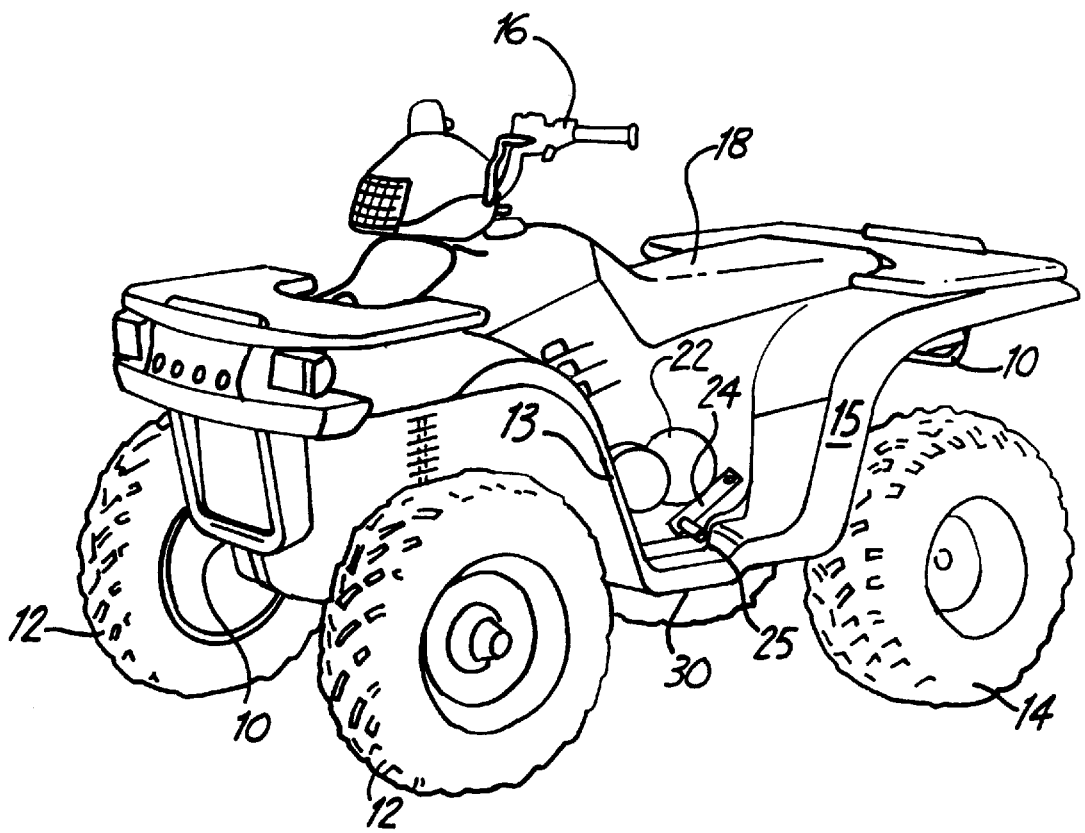
FIG. 1 is a perspective view of an ATV of the invention.
Figure 2:
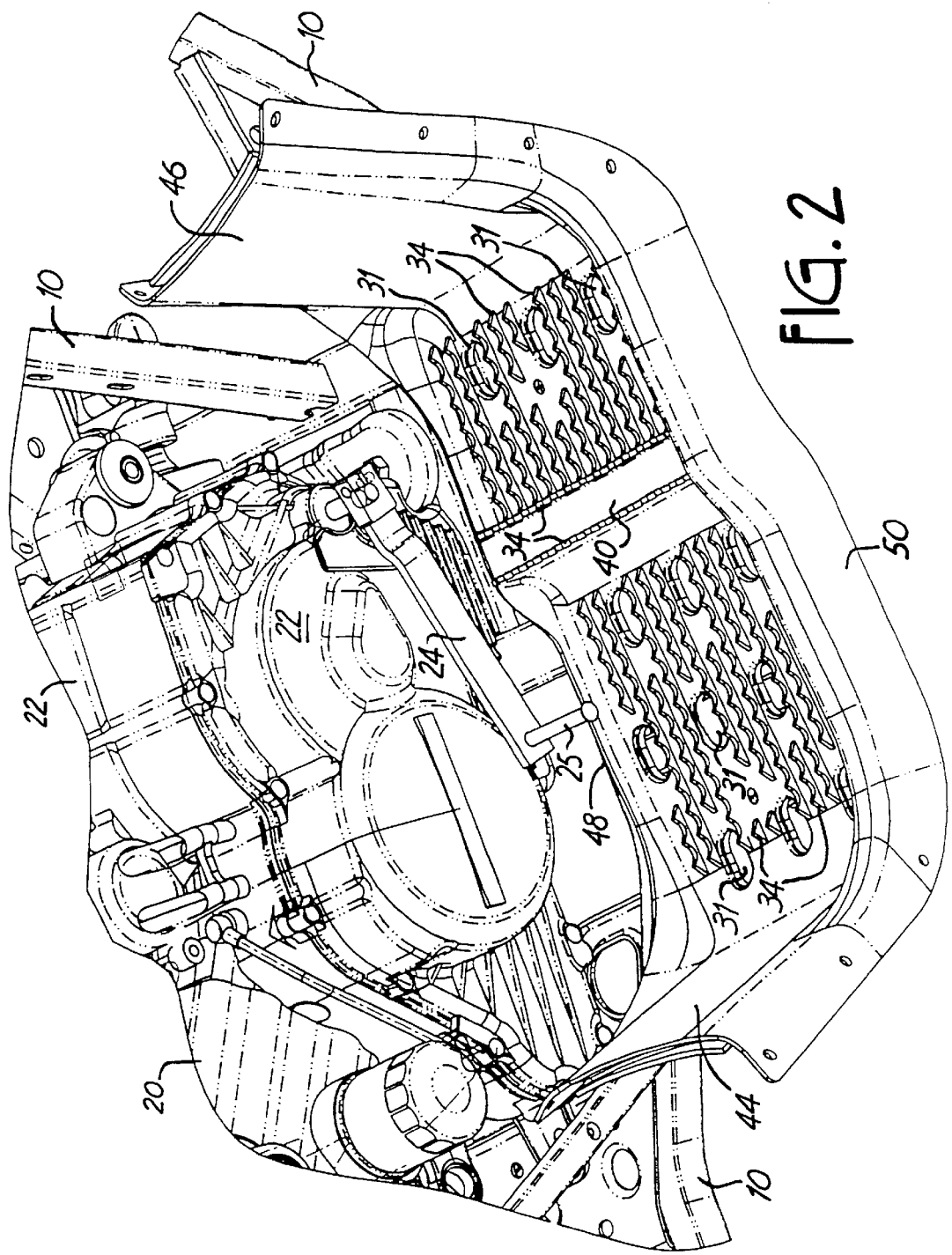
FIG. 2 is an enlarged perspective view of a portion of the ATV of FIG. 1, illustrating the footrest of the invention mounted to the chassis of the ATV adjacent the shift lever.

Referring to FIG. 1, an ATV of the invention includes a chassis, designated generally by reference numeral 10, to which the various systems and components of the vehicle are attached. These components include front wheels 12, rear wheels 14, handlebars 16 connected by a suitable steering linkage to the front wheels 12 for steering the vehicle, and a straddle-type seat 18 upon which the rider sits. An engine 20 and a transmission 22 are carried on the chassis 10 generally beneath the straddletype seat 18 and substantially between a pair footrests (only the left footrest 30 is visible in FIG. 1). The transmission 22 is a manual transmission, connected through a mechanical linkage 24 to a foot-operated shift lever 25 positioned on the left side of the vehicle adjacent to the footrest 30 of the invention (if desired, however, the shift lever 25 could be located on the right side). The shift lever 25 is movable upwardly and downwardly through a range of motion to shift the transmission among a number of forward gears. Up-shifting is achieved by squeezing the clutch lever, moving the toe portion of one's foot beneath the laterally extending shift lever 25 and then lifting up on the shift lever 25. Down-shifting is accomplished by squeezing a clutch lever on the handlebars 16 and then pressing down on the laterally extending shift lever 25. (In ATV's equipped with semi-automatic transmissions, an automatic clutching mechanism eliminates the need for a handlebar mounted clutch lever.)

Since the shift lever is located on the left side, the right footrest may be of a conventional platform-type footrest, such as is shown in U.S. Pat. No. D289,440. Alternately, a footrest 30 of the invention may be used on the right side as well, giving the vehicle a symmetrical feel and facilitating the use of a foot-operated mechanism of another type (such as a brake pedal) on the right side of the vehicle.

FIGS. 2–6 illustrate the details of the preferred footrest 30 of the invention. It includes generally horizontal heel 32 and toe 36 portions, the heel portion 32 being positioned at approximately the same height as the shift lever 25. The toe portion 36 of the footrest 30 is recessed below the level of the heel portion 32 and the shift lever 25, thus permitting the rider to depress the shift lever 25 through its range of motion to a position lower than the heel portion 32 (the shift lever 25 being spaced from the toe portion 36 even when depressed to its lower position) and also permitting the rider to slip the toe portion of his foot under the laterally extending shift lever 25 so he can lift the shift lever 25 to up-shift the transmission.

The heel 32 and toe 36 portions are defined by a generally continuous, generally rectangular, multi-level platform having a width of at least about four inches (preferably at least about five inches) and a length of at least about one foot (preferably at least about fifteen inches). The continuous nature of the platform provides substantially complete protection of the rider's foot from the bottom. Preferably the platform includes holes 31 positioned to permit water to drain out from each of the different levels of the footrest 30, but the holes are sized so that the rider's shoe cannot extend through any of the holes.

The preferred embodiment of the invention depicted in the drawings also includes a generally transversely oriented cleat 40 positioned between the heel portion 32 and the toe portion 36. Thus, the cleat 40 defines both the forward edge of the heel portion 32 and the rearward edge of the toe portion 36 of the footrest 30. The cleat 40 has an upper surface positioned higher than the heel portion 32 of the footrest 30. As indicated above, preferably the heel 32 and toe 36 portions of the footrest 30 are formed by a generally continuous platform, and preferably the cleat 40 forms an integral part of this generally continuous platform. The cleat 40 is sized and positioned to provide the rider with a structure against which the heel of his boot or shoe may be placed, providing good foot heel location on the platform and also providing an edge around which his foot may pivot during shifting.

Figure 3:
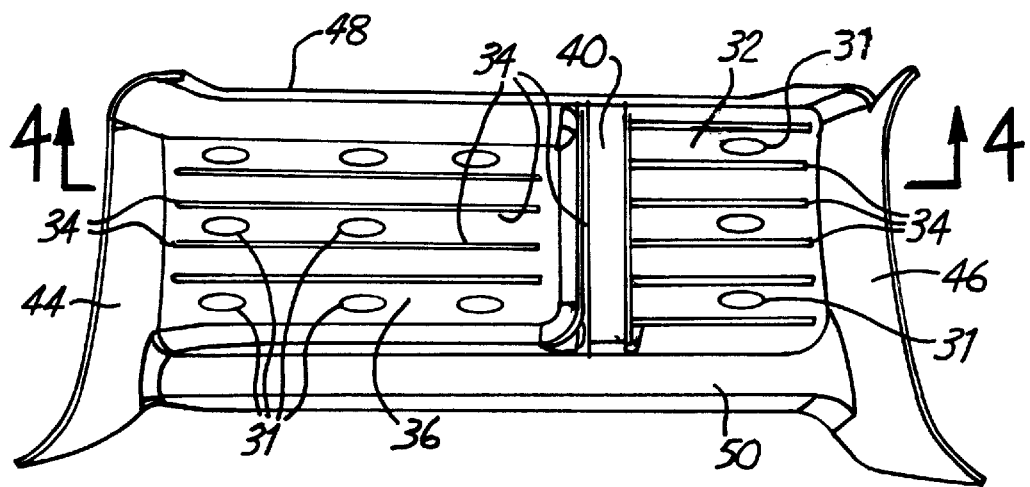
FIG. 3 is a top view of the footrest of the invention.
Figure 4:
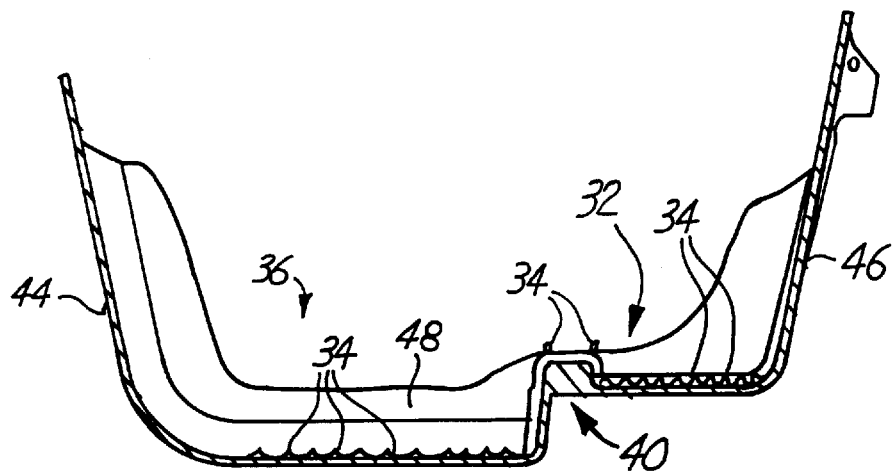
FIG. 4 is a cross-sectional view of FIG. 3, taken along lines 4—4 thereof.
Figure 5:
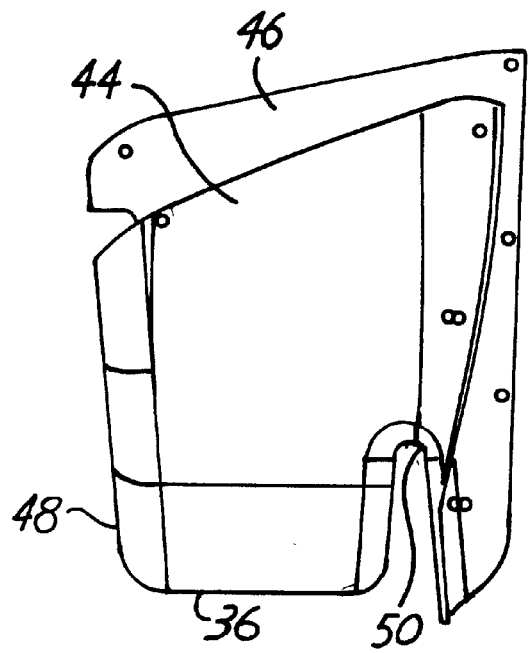
FIG. 5 is a front end view of FIG. 3.
Figure 6:
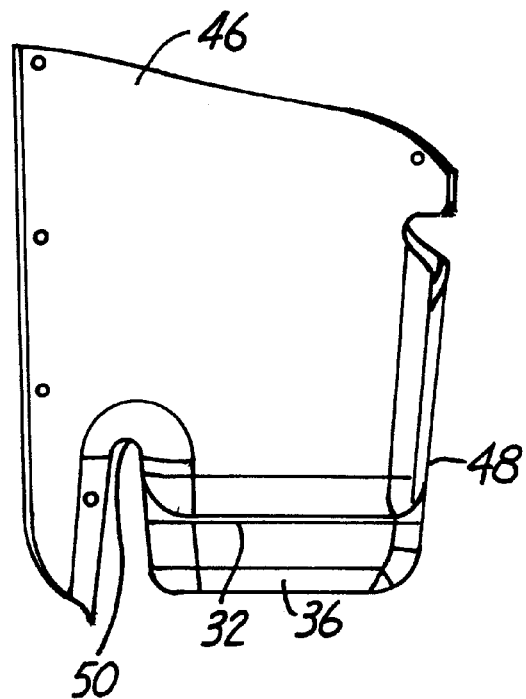
FIG. 6 is a rear end view of FIG. 3.

As can be seen particularly in FIG. 3, the platform (comprised of the heel portion 32, the cleat 40 and the toe portion 36) is generally rectangular in shape and includes front 44, rear 46 and side 48 walls extending upwardly from edges of the platform. Referring again to FIGS. 1 and 2, preferably the front wall 44 of the footrest forms a part of the front fender 13 of the vehicle, and preferably the rear wall 46 of the footrest forms a part of the rear fender 15 of the vehicle. Thus, the footrest 30 together with the fenders 13 and 15 provide a substantial enclosure about the foot and lower leg of the rider. An outer flange 50 is preferably provided both for structural rigidity and to help prevent the rider's foot from inadvertently slipping off the platform. Preferably the heel portion 32, the upper surface of the cleat 40 and the toe portion 36 are provided with several parallel scalloped ribs 34 for added traction for the boot of the rider. The shift lever 25 is positioned so that it is spaced at least about three inches, and preferably about five to seven inches, forwardly of the forward edge of the heel portion 32 (i.e., the rearward edge of the cleat 40), and, thus, about four to five inches (three inches being a practical minimum) forwardly of the forward edge of the cleat 40.

Figure 7:
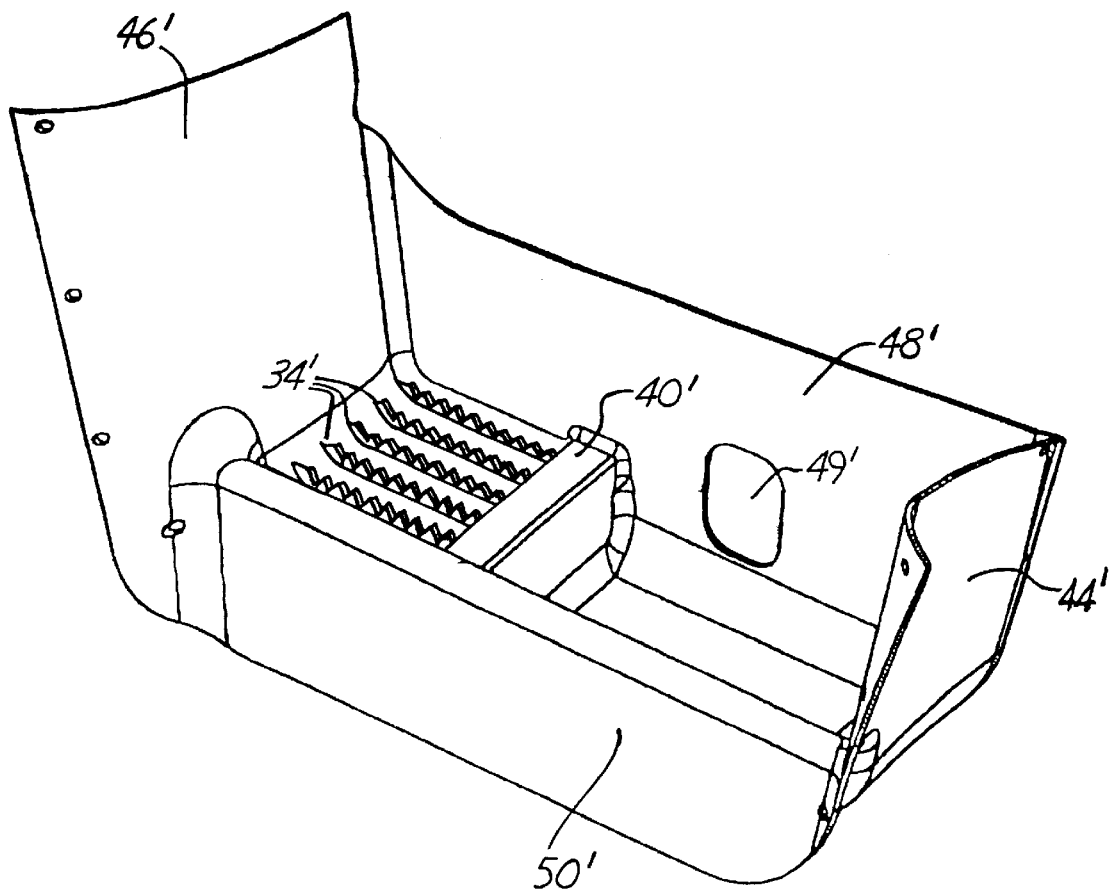
FIG. 7 is a perspective view of a footrest useable on the opposite side of the ATV from the shift lever.

FIG. 7 illustrates a generally mirror-image footrest 30' which may be utilized on the opposite site (i.e., typically the right side) of the ATV to give the rider a symmetrical feel when riding on the vehicle. The side wall 48' of the right footrest 30' may include an opening 49' positioned adjacent to the toe portion 36', permitting, e.g., a brake lever (not shown) to extend through the opening 49' for operation by the rider's right foot.

The footrest 30 of the invention can be made from any suitable material. If desired, it may be fabricated from metal components. Preferably, however, it is injection molded from a fiber-filled plastic resin. Suitable fiber-filled resins having desirable characteristics and also producing the desired finish characteristics are available commercially from Polymer Composites, Inc. of Winona, Minn., under the trademark CELLSTRAN®. A particularly preferred CELLSTRAN® glass filled polypropylene resin is sold under the designation PPG 40-02-4 (this particular resin has 40% glass fibers, and is supplied in pellet form, preferably in pellets 11 mm in length, therefore containing glass fibers of the same length).

While a preferred embodiment of the present invention has been described, it should be understood that various changes, adaptations and modifications may be made therein without departing from the spirit of the invention and the scope of the appended claims.

What is claimed is:

1. An all terrain vehicle comprising;
  a chassis carrying a straddle type seat which is adapted to be straddled by a rider;
  a pair of rear wheels mounted to the chassis;
  a laterally extending footrest on one side of the chassis; and
  an engine carried by the chassis and connected to a manual transmission which in turn is connected to a drive train supplying motive power to at least some of the wheels, the transmission including a foot-operable shift lever located on one side of the chassis adjacent the footrest for shifting the transmission among a plurality of forward gears;
  the footrest having generally horizontal heel and toe portions, the shift lever being positioned above the toe portion of the footrest, and the toe portion being positioned lower than the heel portion, permitting a rider to depress the shift lever to a position lower than the heel portion of the footrest yet insert at least a portion of a foot beneath the shift lever, allowing the rider to move the shift lever upward to shift the manual transmission.

2. The all terrain vehicle of claim 1 wherein the shift lever is positioned above the toe portion and forwardly of the heel portion a sufficient distance to permit the rider to so move the shift lever upward.

3. The all terrain vehicle of claim 1 wherein the heel and toe portions are defined by a continuous platform having a width of at least about four inches and a length of at least about one foot.

4. The all terrain vehicle of claim 3 wherein the platform is configured and arranged so as to prevent a toe of a rider's shoe from extending therethrough.

5. The all terrain vehicle of claim 3 wherein the platform includes one or more holes to permit water to drain therethrough, each such hole being sized to prevent a toe of a rider's foot from extending therethrough.

6. The all terrain vehicle of claim 3 wherein the platform includes one or more holes to permit water to drain therethrough, such holes being sized and positioned to prevent a rider's shoe from extending therethrough.

7. The all terrain vehicle of claim 1 further comprising a cleat disposed at a forward edge of the heel portion, the cleat having an upper surface positioned higher than the heel portion of the footrest.

8. The all terrain vehicle of claim 7 wherein the heel and toe portions of the footrest are defined by a continuous platform, the cleat being formed integrally with the platform and defining the forward edge of the heel portion and a rearward edge of the toe portion of the footrest.

9. The all terrain vehicle of claim 1 wherein the shift lever is movable vertically through a range of motion having upper and lower ends, the shift lever being spaced above the toe portion of the footrest when the shift lever is at its lower end of movement.

10. The all terrain vehicle of claim 1 wherein the shift lever is spaced at least about three inches forwardly of the heel portion of the footrest.

11. The all terrain vehicle of claim 1 wherein the heel and toe portions of the footrest are defined by a generally rectangular platform, the footrest including front, rear and side walls extending upwardly from edges of the platform.

12. The all terrain vehicle of claim 11 wherein the footrest is disposed between one of the front wheels and one of the rear wheels, the all terrain vehicle including a front fender associated with such front wheel and a rear fender associated with such rear wheel.

13. The all terrain vehicle of claim 12 wherein the front wall of the footrest forms a part of the front fender.

14. The all terrain vehicle of claim 12 wherein the rear wall of the footrest forms a part of the rear fender.

15. The all terrain vehicle of claim 1 wherein the footrest has a width of at least about four inches and a length of at least about one foot.

16. The all terrain vehicle of claim 1 wherein the footrest has a width of at least about five inches and a length of at least about fifteen inches.

17. An all terrain vehicle comprising:
  a chassis carrying a straddle-type seat which is adapted to be straddled by a rider;
  a pair of front wheels mounted to the chassis, and handlebars connected to the front wheels for steering the front wheels;
  a pair of rear wheels mounted to the chassis;
  laterally extending footrests on opposite sides of the chassis; and
  an engine carried by the chassis and connected to a manual transmission which in turn is connected to a drive train supplying motive power to at least some of the wheels, the transmission including a foot-operable shift lever adapted to shift the transmission among a plurality of forward gears, the shift lever being located on one side of the chassis adjacent one of the footrests;
  the footrest which is adjacent to the foot-operable shift lever having generally horizontal heel and toe portions, the toe portion being positioned lower than the heel portion and the shift lever being positioned at generally the same height as the heel portion, thereby defining a space between the shift lever and the footrest into which an operator may insert at least a portion of a foot to move the shift lever upward to shift the manual transmission.

18. An all terrain vehicle comprising;
  a chassis carrying a straddle-type seat which is adapted to be straddled by a rider;
  a pair of front wheels mounted to the chassis, and handlebars connected to the front wheels for steering the front wheels;
  a pair of rear wheels mounted to the chassis;
  a laterally extending footrest on one side of the chassis; and
  an engine carried by the chassis and connected to a manual transmission which in turn is connected to a drive train supplying motive power to at least some of the wheels, the transmission including a foot-operable shift lever adapted to shift the transmission among a plurality of forward gears, the shift lever being located on one side of the chassis adjacent the footrest;
  the footrest having heel and toe portions, the toe portion being positioned lower than the heel portion, the shift lever being spaced from the toe portion and the heel portion to permit the rider to insert at least a portion of a foot beneath the shift lever, allowing the rider to move the shift lever upward to shift the manual transmission,
  the heel and toe portions being defined by a continuous platform, the platform being arranged so as to prevent a toe of a rider's shoe from extending therethrough.

* * * * *

(12) EX PARTE REEXAMINATION CERTIFICATE (5911th)
United States Patent
Maki et al.

(10) Number: US 6,270,106 C1
(45) Certificate Issued: Oct. 2, 2007

(54) ALL TERRAIN VEHICLE WITH FULL PLATFORM STYLE FOOTREST AND FOOT SHIFTED MANUAL TRANSMISSION

(75) Inventors: Richard R. Maki, Roseau, MN (US); Alan S. Olson, Roseau, MN (US); Mihai Rasidescu, Warroad, MN (US); Timothy S. Wysocki, Roseau, MN (US)

(73) Assignee: Polaris Industries, Inc., Minneapolis, MN (US)

Reexamination Request:
No. 90/008,099, Aug. 25, 2006

Reexamination Certificate for:
Patent No.: 6,270,106
Issued: Aug. 7, 2001
Appl. No.: 09/128,573
Filed: Aug. 4, 1998

(51) Int. Cl.
B62H 1/00 (2006.01)

(52) U.S. Cl. .................. 280/291; 280/824; 280/762; 280/163; 280/169; 280/748; 180/21
(58) Field of Classification Search ............... 280/291, 280/169, 748, 762, 824; 180/21
See application file for complete search history.

(56) References Cited

U.S. PATENT DOCUMENTS

| | | | |
|---|---|---|---|
| 3,919,896 A | 11/1975 | Foster | |
| 4,023,821 A | 5/1977 | Eiland | |
| 4,083,263 A | 4/1978 | Lundquist | |
| 4,299,139 A | 11/1981 | Krüger et al. | |
| 4,304,315 A | 12/1981 | Hirakawa et al. | |
| 4,372,416 A | 2/1983 | Igarashi | |
| 4,451,057 A | 5/1984 | Lawson | |
| 4,456,090 A | 6/1984 | Malenotti | |
| 4,458,910 A | 7/1984 | Stillwagon | |
| 4,470,321 A | 9/1984 | Girty | |
| D283,413 S * | 4/1986 | Preisler et al. | D12/114 |
| 4,620,575 A | 11/1986 | Cuba et al. | |
| 4,650,029 A | 3/1987 | Foote et al. | |
| 4,664,208 A | 5/1987 | Horiuchi et al. | |
| D294,686 S | 3/1988 | Ableidinger et al. | |
| 4,728,121 A | 3/1988 | Graves | |
| 4,741,222 A * | 4/1988 | Berndt | 74/481 |
| 4,768,799 A | 9/1988 | Millican | |
| 4,802,684 A | 2/1989 | Bennett et al. | |
| 4,852,900 A | 8/1989 | Nahachewski | |
| 4,973,082 A | 11/1990 | Kincheloe | |

(Continued)

FOREIGN PATENT DOCUMENTS

| | | |
|---|---|---|
| JP | 0293283 | 12/1990 |
| JP | 404278889 | 10/1992 |

*Primary Examiner*—Matthew C. Graham

(57) ABSTRACT

An all terrain vehicle with a foot-shifted manual transmission and a full platform-style footrest. The all terrain vehicle has a chassis carrying a straddle-type seat which is sufficiently narrow to be straddled by a rider. A laterally extending footrest is provided on each side of the chassis. The manual transmission includes a foot-operable shift lever located on one side of the chassis adjacent the footrest for shifting the transmission among a plurality of forward gears. The footrest is generally rectangular, having generally horizontal heel and toe portions, and the shift lever is positioned at approximately the same height as the heel portion. The toe portion is positioned lower than the heel portion, permitting a rider to depress the shift lever to a position lower than the heel portion of the footrest to downshift the transmission, and permitting the rider to insert his toe in between the toe portion of the footrest and the shifting lever to move the lever upwards to upshift the transmission. The platform is configured and arranged so as to prevent a toe of a rider's shoe from extending therethrough, however, thus providing full protection of the foot from below. The footrest includes a cleat formed integrally with the platform, the cleat having an upper surface positioned higher than the heel portion of the footrest. The cleat defines the forward edge of the heel portion and the rearward edge of the toe portion of the footrest, provides good foot heel location on the footrest and provides an edge about which the rider's foot may pivot during shifting.

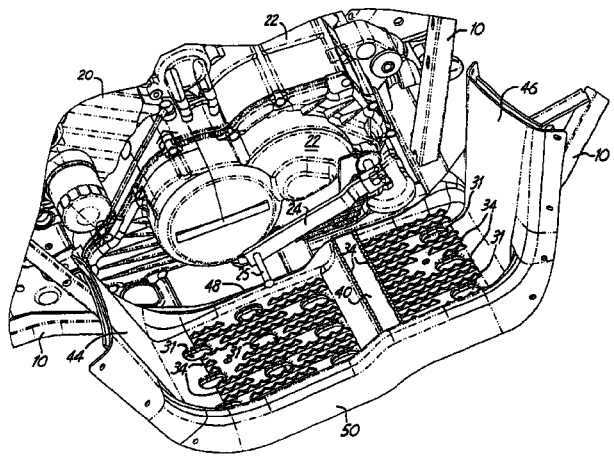

U.S. PATENT DOCUMENTS

| | | |
|---|---|---|
| 5,062,675 A | 11/1991 | Rhoden et al. |
| 5,090,715 A | 2/1992 | Nakajima et al. |
| 5,107,952 A | 4/1992 | Matsubayashi et al. |
| 5,152,382 A | 10/1992 | Hoch et al. |
| 5,515,940 A * | 5/1996 | Shichinohe et al. ........ 180/376 |
| 5,661,999 A | 9/1997 | Carone |
| 5,695,023 A | 12/1997 | Knurr et al. |
| D389,440 S | 1/1998 | Walters et al. |
| D395,024 S | 6/1998 | Baratti |
| 5,779,254 A | 7/1998 | James et al. |
| 5,826,463 A | 10/1998 | Monson |
| 5,845,918 A | 12/1998 | Grinde et al. |
| D405,029 S | 2/1999 | Deutschman |
| 5,893,424 A | 4/1999 | Hisada |
| 6,113,112 A | 9/2000 | Kubelka |
| 6,116,630 A | 9/2000 | Thomas |
| 6,178,613 B1 | 1/2001 | Monson |
| 6,182,784 B1 | 2/2001 | Pestotnik |
| 6,523,634 B1 | 2/2003 | Gagnon et al. |

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

* * * * *